(12) United States Patent
Baker

(10) Patent No.: US 11,117,070 B2
(45) Date of Patent: Sep. 14, 2021

(54) VAPOR RECOVERY SYSTEM AND METHOD

(71) Applicant: Flogistix, LP, Oklahoma City, OK (US)

(72) Inventor: Aaron Baker, Pampa, TX (US)

(73) Assignee: Flogistix, LP, Oklahoma City, OK (US)

( * ) Notice: Subject to any disclaimer, the term of this patent is extended or adjusted under 35 U.S.C. 154(b) by 648 days.

(21) Appl. No.: 16/071,430

(22) PCT Filed: Jan. 18, 2017

(86) PCT No.: PCT/US2017/013942
§ 371 (c)(1),
(2) Date: Jul. 19, 2018

(87) PCT Pub. No.: WO2017/127426
PCT Pub. Date: Jul. 27, 2017

(65) Prior Publication Data
US 2021/0228997 A1  Jul. 29, 2021

Related U.S. Application Data

(60) Provisional application No. 62/281,961, filed on Jan. 22, 2016.

(51) Int. Cl.
*B01D 1/28* (2006.01)
*C10G 7/00* (2006.01)
*C10G 31/06* (2006.01)

(52) U.S. Cl.
CPC ......... *B01D 1/2856* (2013.01); *B01D 1/2881* (2013.01); *C10G 7/00* (2013.01); *C10G 31/06* (2013.01); *C10G 2300/4012* (2013.01)

(58) Field of Classification Search
CPC ...... B01D 1/2856; B01D 1/28; B01D 1/2881; B01D 19/0073; C10G 31/06; C10G 7/00; C10G 2300/4012; E21B 43/32
See application file for complete search history.

(56) References Cited

U.S. PATENT DOCUMENTS 2,309,075 A * 1/1943 Hill .................. E21B 43/40
166/266
2,899,013 A   8/1959 Carter
(Continued)

FOREIGN PATENT DOCUMENTS

CA   2647825   10/2007
EP   0627249   12/1994

OTHER PUBLICATIONS

International Search Report and Written Opinion of the International Searching Authority dated Apr. 14, 2017 filed in related application PCT/US2017/013942.
(Continued)

*Primary Examiner* — Emmanuel E Duke
(74) *Attorney, Agent, or Firm* — McAfee & Taft

(57) ABSTRACT

Disclosed is an improved vapor recovery system. The vapor recovery system includes a vapor recovery tower and a vapor recovery unit. The vapor recovery tower includes an internal heat exchanger suitable for heating crude oil processed by the vapor recovery tower. The vapor recovery unit includes a compressor suitable for compressing and thereby heating vapors and gases separated from crude oil by the vapor recovery tower. The gases heated by compression within the vapor recovery unit subsequently pass through the jacket or shell of the heat exchanger.

24 Claims, 2 Drawing Sheets

(56) References Cited

U.S. PATENT DOCUMENTS

| | | | |
|---|---|---|---|
| 3,138,150 A | | 6/1964 | Hyer et al. |
| 4,246,938 A | | 1/1981 | Morgan |
| 4,536,280 A | | 8/1985 | White, Jr. et al. |
| 4,617,030 A | | 10/1986 | Heath |
| 5,017,240 A | | 5/1991 | Brown |
| 5,881,569 A | * | 3/1999 | Campbell .............. F25J 3/0209 62/621 |
| 5,897,690 A | | 4/1999 | McGrew |
| 7,780,766 B2 | * | 8/2010 | Thompson ........... B01D 53/002 95/272 |
| 9,522,347 B2 | | 12/2016 | Swan |
| 2011/0024259 A1 | | 2/2011 | Wallace et al. |
| 2012/0079851 A1 | | 4/2012 | Heath et al. |
| 2013/0204055 A1 | | 8/2013 | Davis et al. |
| 2015/0231525 A1 | * | 8/2015 | Swan ................ B01D 19/0073 203/81 |

OTHER PUBLICATIONS

Oil & Gas Subcommittee Technology Transfer Workshop, Reducing Methane Emissions with Vapor Recovery on Storage Tanks, Jan. 8, 2009, pp. 1-28, Monterrey, Mexico.
Richards, Larry S., Use of Vapor Recovery Towers & VRU's to Reduce Emissions, 2014, pp. 1-29, Denver, Colorado.
European Search Report received in related appln. No. 17741849.8 dated Aug. 19, 2019, pp. 1-10.
Indonesia Examination Report received in related appln. No. P00201806267, dated Jul. 7, 2020, pp. 1-2.
Chinese Office Action received in related appln. No. 2017800177145, dated Mar. 24, 2020, pp. 1-16.

* cited by examiner

VAPOR RECOVERY SYSTEM AND METHOD

CROSS REFERENCE TO RELATED APPLICATION

This application claims benefit of Provisional Patent Application No. 62/281,961 filed Jan. 22, 2016.

SUMMARY

The present disclosure provides a vapor recovery system comprising a vapor recovery tower configured to receive crude oil. The vapor recovery tower includes a crude oil inlet, a crude oil outlet, a gas outlet, a vapor inlet and a vapor outlet. The system also comprises a vapor recovery unit in fluid communication with the gas outlet of the vapor recovery tower and the vapor inlet of the vapor recovery tower. Positioned within the vapor recovery tower is a heat exchanger in fluid communication with the vapor inlet and vapor outlet of the vapor recovery tower.

The present disclosure also describes a method for using the vapor recovery system. The method comprises the steps of passing a crude oil into a vapor recovery tower and separating gaseous hydrocarbons and vaporizable hydrocarbons from the crude oil. The gaseous hydrocarbons and vaporizable hydrocarbons are passed to a vapor recovery unit and compressed. Subsequently the compressed, hot gaseous hydrocarbons and vaporizable hydrocarbons are passed through a heat exchanger positioned within the vapor recovery tower wherein heat energy is transferred from the gaseous hydrocarbons and vaporizable hydrocarbons to crude oil passing through the vapor recovery tower thereby enhancing the extraction of gaseous hydrocarbons from the crude oil within the vapor recovery tower.

DETAILED DESCRIPTION

Figure 1:
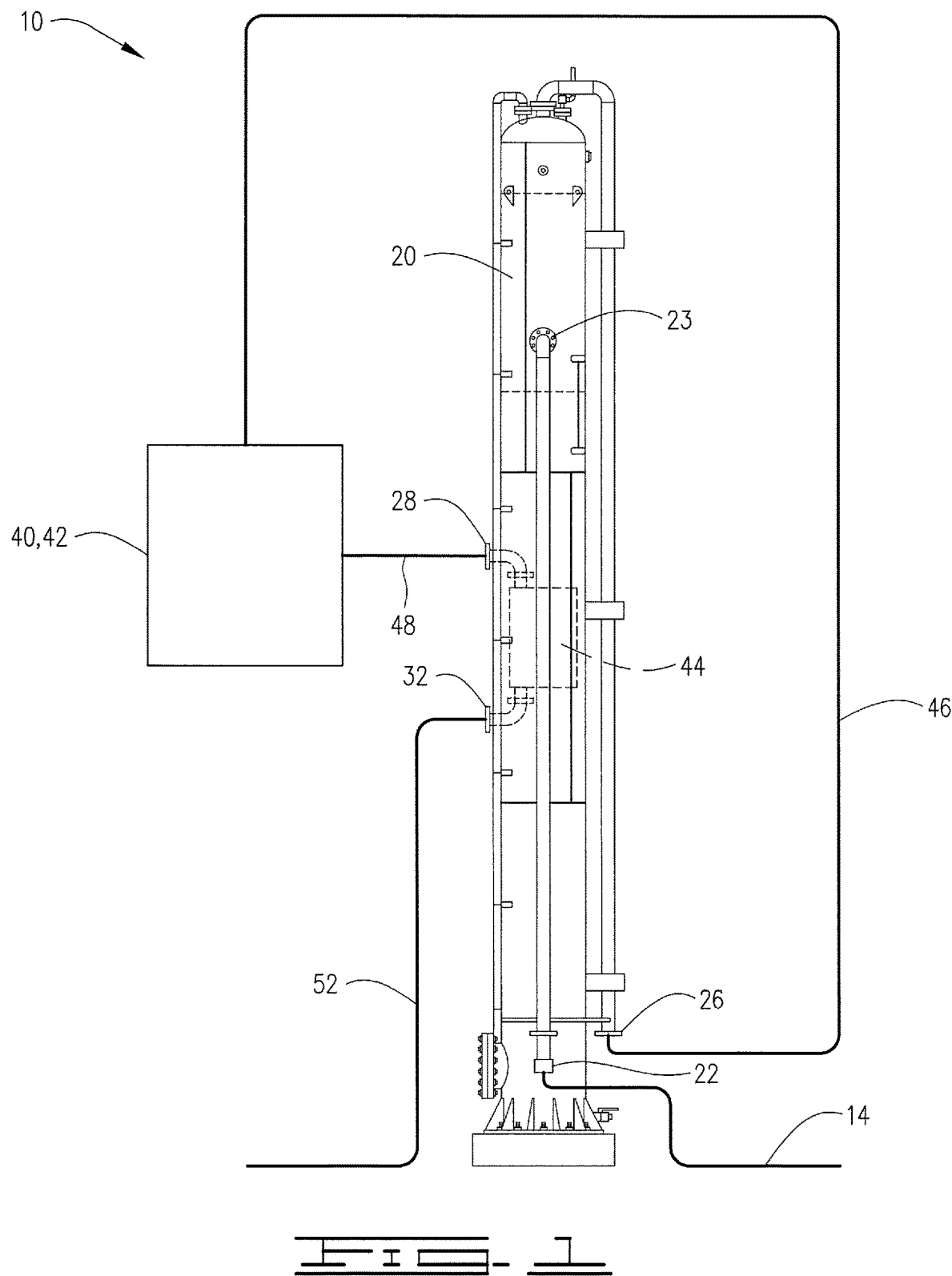
FIG. 1 depicts a first view of a vapor recovery system including a vapor recovery tower and vapor recovery unit.
Figure 2:
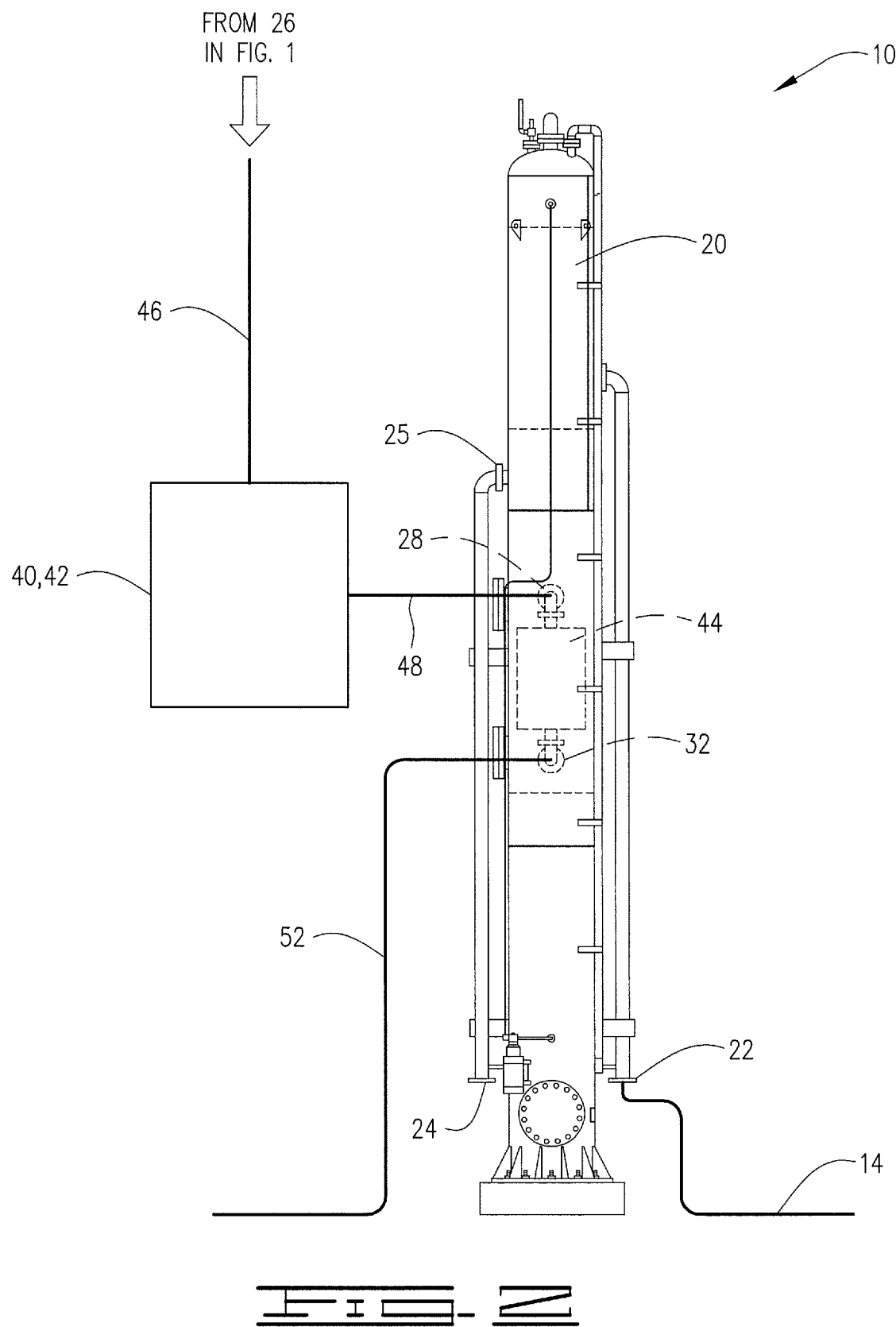
FIG. 2 depicts a second view of the vapor recovery system of FIG. 1 taken ninety degrees from that of FIG. 1.

With reference to the FIGS., disclosed herein are systems and methods for collecting gas from crude oil. The FIGS. depict an improved vapor recovery system capable of increasing the yield of gaseous hydrocarbons from crude oil. Reducing the gaseous component of crude oil prior to transporting the crude oil to a tank battery will reduce the amount of gas vented and flared from the tank battery.

As depicted in the FIGS., vapor recovery system 10 includes a vapor recovery tower 20, a vapor recovery unit 40 and a heat exchanger 44 positioned within vapor recovery tower 20. Vapor recovery tower 20 includes a crude oil inlet 22 in fluid communication with a pipeline, not shown. Vapor recovery tower 20 also includes a crude oil outlet 24 in fluid communication a second pipeline, not shown. Conduit 46 provides fluid communication between gas outlet 26 carried by vapor recovery tower 20 and vapor recovery unit 40. Vapor recovery unit 40 includes a compressor 42 capable of scavenging or pulling gas from vapor recovery tower 20. Vapor recovery tower 20 also carries a vapor inlet 28 and a vapor outlet 32. Conduit 48 provides fluid communication between vapor recovery unit 40 and vapor inlet 28. Vapor inlet 28 is in fluid communication with a heat exchanger 44. Heat exchanger 44 receives compressed, hot gaseous vapors from vapor recovery unit 40. Heat exchanger 44 provides the ability to transfer heat from one flowing fluid to another flowing fluid. In this instance, heat exchanger 44 transfers heat from the compressed gaseous vapors to crude oil. Heat exchanger 44 is also in fluid communication with vapor inlet 28 and vapor outlet 32. Vapor outlet 32 in turn conveys the compressed gaseous vapors to a pipeline 52. Thus, system 10 occupies a footprint no greater than current vapor recovery systems. However, as discussed below in the method of operating system 10, the disclosed vapor recovery system enhances the recovery of the gaseous and vaporizable components from crude oil prior to conveying the crude oil to a tank farm or refinery.

Heat exchanger 44 may be any one of several designs capable of transferring heat from one flowing fluid to another flowing fluid. One convenient heat exchanger suitable for use in vapor recovery system 10 is a shell and tube heat exchanger, also known as a jacket and tube heat exchanger. Shell and tube heat exchangers are commonly used in oil refineries. As known to those skilled in the art, a shell and tube heat exchanger includes a jacket or shell such that one fluid will pass through the tubes while another passes over the tubes through the shell of the heat exchanger. In this instance, the tubes will transport the crude oil passing through vapor recovery tower 20 while the hot gaseous and vaporizable components are flowing through the jacket and passing over the tubes. Thus, within shell and tube heat exchanger 44, heat will transfer from the hot gaseous and vaporizable components to the crude oil. Shell and tube exchangers suitable for use herein will have tubes with external diameters ranging from about 0.5 inch to about 1 inch and wall thicknesses of about 0.04" to about 0.120 inch. The number of tubes in shell and tube heat exchanger 44 will be limited only by the size of vapor recovery unit 20. Preferably, heat exchanger 44 will be capable of transferring heat energy from about 2 to about 10 btu/minute for each barrel of oil processed per day.

The method of operating the vapor recovery system begins with the passage of crude oil from a well or other source through a pipeline 14 into vapor recovery tower 20 via crude oil inlet 22. Vapor recovery tower 20 typically operates at a temperature between about 40° F. and 250° F. and pressures of about −5 psig to about 25 psig. The flow rate of crude oil through vapor recovery tower 20 may range from about 10 barrels per day to about 5000 barrels per day. Under these conditions, natural gas and other vaporizable components will be isolated from the oil at the top of vapor recovery tower 20. As shown in the FIGS. crude oil enters vapor recovery tower 20 at crude oil inlet 22. After passing through inlet nozzle 23, crude oil passes downward through vapor recovery tower 20 and through the tubes of heat exchanger 44. Subsequently crude oil flows through an interior passage, not shown, to nozzle 25 and passes to crude oil outlet 24.

The gases and vaporizable components isolated by vapor recovery tower 20 exit vapor recovery tower 20 through gas outlet 26 and pass through a conduit 46 to vapor recovery unit 40. Gases and vapors passing through conduit 46 may be under a pressure of about minus 5 psig, i.e. a vacuum, to a positive pressure of about 25 psig and at temperatures between about 70° F. and 150° F.

Upon entering vapor recovery unit 40, the recovered gases and vapors are compressed. As a result, the temperature of the gas and vapors exiting vapor recovery unit 40 will be between about 180° F. and about 275° F. The compressed gas and vapors pass through conduit 48 to vapor inlet 28 of vapor recovery tower 20. After passing through vapor inlet 28, the compressed gas and vapors pass through the shell of heat exchanger 44. Heat exchanger 44 transfers heat from the compressed gas and vapors to the crude oil passing through the tubes of heat exchanger 44 within vapor recovery tower 20. The compressed gas and/or vapor phases pass through the shell of heat exchanger 40 at a rate between about 10 thousand standard cubic feet per day and about 2 million standard cubic feet per day.

Thus, vapor recovery system 10 captures and utilizes heat normally lost to the atmosphere. Vapor recovery system 10 uses heat exchanger 44 to transfer the captured heat energy to the crude oil passing through the tubes of heat exchanger 44 thereby inducing phase change from liquid to gas and vapors within vapor recovery tower 20. As noted above, heat exchanger 44 transfers heat energy in the range of about 2 to about 10 btu/minute for each barrel of oil processed per day from the compressed gas and vaporizable components to the crude oil passing through heat exchanger 44 within vapor recovery tower 20. Thus, for example in one embodiment, heat exchanger 44 will be capable of transferring about 2230 btu/minute when crude oil flows at a rate of about 750 barrels per day.

As noted above, heat exchanger 44 is in fluid communication with vapor outlet 32. Thus, following the heat exchange step, compressed gas and vaporizable components flow from heat exchanger 40 to vapor outlet 32 and subsequently enter a sales transmission pipeline 52. Accordingly, compressor 42 of vapor recovery unit 40 will typically operate to provide an operational pressure at vapor outlet 32 sufficient to permit flow of gases and vapors into sales transmission pipeline 52.

Other embodiments of the present invention will be apparent to one skilled in the art. As such, the foregoing description merely enables and describes the general uses and methods of the present invention. Accordingly, the following claims define the true scope of the present invention.

What is claimed is:

1. A system comprising:
    a vapor recovery tower configured to receive crude oil, said vapor recovery tower having a crude oil inlet, a crude oil outlet, a gas outlet, a vapor inlet and a vapor outlet,
    a compressor in fluid communication with the gas outlet and the vapor inlet of said vapor recovery tower;
    a heat exchanger located within said vapor recovery tower, the heat exchanger configured to transfer heat from a fluid passing through the heat exchanger to crude oil within said vapor recovery tower, said heat exchanger in fluid communication with said vapor inlet and said vapor outlet,
    a conduit providing fluid communication between said vapor inlet and said compressor wherein said heat exchanger receives fluid from said compressor via said vapor inlet and said heat exchanger is in fluid communication with a pipeline via said vapor outlet.

2. The system of claim 1, wherein said heat exchanger is a shell and tube heat exchanger and said fluid is a vapor or gas previously obtained from crude oil passing through said system.

3. The system of claim 1, wherein said heat exchanger is configured to transfer from heat energy from about 2 to about 10 btu/minute for each barrel of oil per day.

4. The system of claim 1, wherein said heat exchanger is a shell and tube heat exchanger having a plurality of tubes.

5. The system of claim 1, wherein said fluid received from said compressor is a gas or vapor and wherein the conduit providing fluid communication between said compressor and said vapor inlet is configured to operate at pressures ranging from about 0 psig to about 350 psig and temperatures ranging from about 70° F. to about 275° F.

6. A system comprising:
    a vapor recovery tower configured to receive crude oil from a production well, said vapor recovery tower having a crude oil inlet, a crude oil outlet, a gas outlet, a vapor inlet and a vapor outlet,
    a compressor in fluid communication with the gas outlet and the vapor inlet of said vapor recovery tower;
    a heat exchanger located within said vapor recovery tower, the heat exchanger configured to transfer heat from a fluid passing through the heat exchanger to crude oil within said vapor recovery tower, said heat exchanger in fluid communication with said vapor inlet and said vapor outlet,
    a conduit providing fluid communication between said vapor inlet and said compressor wherein said heat exchanger receives fluid from said compressor via said vapor inlet and said heat exchanger is in fluid communication with a pipeline via said vapor outlet.

7. The system of claim 6, wherein said heat exchanger is selected from the group consisting of shell and tube heat exchanger.

8. The system of claim 6, wherein said fluid is a vapor or gas previously obtained from crude oil passing through said system.

9. The system of claim 6, wherein said heat exchanger is configured to transfer from heat energy from about 2 to about 10 btu/minute for each barrel of oil per day.

10. The system of claim 6, wherein said heat exchanger is a shell and tube heat exchanger having a plurality of tubes.

11. The system of claim 6, wherein said fluid received from said compressor is a gas or vapor and wherein the conduit providing fluid communication between said compressor and said vapor inlet is configured to operate at pressures ranging from about 0 psig to about 350 psig and temperatures ranging from about 70° F. to about 275° F.

12. A method comprising:
    passing a crude oil containing volatile compounds through a vapor recovery tower;
    within the vapor recovery tower, inducing a phase change in a portion of the volatile compounds from a liquid phase to a gas and/or vapor phase;
    separating the gas and/or vapor phase from liquid hydrocarbons;
    passing the separated gas and/or vapor phase to a vapor recovery unit, wherein the vapor recovery unit is a compressor;
    compressing said gas and/or vapor phase prior to passing said gas and/or vapor through a heat exchanger located within said vapor recovery tower;
    passing the compressed gas and/or vapor phase through said heat exchanger thereby transferring heat from the compressed gas and/or vapor phase to crude oil within said vapor recovery tower thereby enhancing the phase change of volatile compounds within said crude oil from the liquid state to a gas and/or vapor state.

13. The method of claim 12, wherein the step of compressing said gas and/or vapor phase increases the temperature of said gas and/or vapor phase to a temperature between about 180° F. and about 275° F.

14. The method of claim 12, wherein the step of compressing places said gas and/or vapor phase under a pressure of about 0 psig to about 350 psig as the compressed gas and/or vapor phase passes through said heat exchanger.

15. The method of claim 12, wherein said compressed gas and/or vapor phase passes through said heat exchanger at a rate between about 10 thousand standard cubic feet per day up to about 2 million standard cubic feet per day.

16. The method of claim 12, wherein said vapor recovery tower operates at a pressure between about −5 psig and about 25 psig and a temperature between about 40° F. and about 250° F.

17. The method of claim 12, wherein crude oil flows through said vapor recovery tower at a rate of about 10 bbl/day to about 5000 bbl/day.

18. The method of claim 12, wherein said compressed gas and/or vapor phase exits said heat exchanger and said vapor recovery tower and enters a pipeline.

19. The method of claim 12, wherein said heat exchanger has a heat exchange rate of about 2 to about 10 btu/minute for each barrel of oil per day.

20. A system comprising:
a vapor recovery tower configured to receive crude oil, said vapor recovery tower having a crude oil inlet, a crude oil outlet, a gas outlet, a vapor inlet and a vapor outlet,
a compressor in fluid communication with the gas outlet and the vapor inlet of said vapor recovery tower;
a heat exchanger configured to transfer from heat energy from about 2 to about 10 btu/minute for each barrel of oil per day passing through said heat exchanger, said heat exchanger located within said vapor recovery tower, the heat exchanger configured to transfer heat from a fluid passing through the heat exchanger to crude oil within said vapor recovery tower, said heat exchanger in fluid communication with said vapor inlet and said vapor outlet,
a conduit providing fluid communication between said vapor inlet and said compressor wherein said heat exchanger receives fluid from said compressor via said vapor inlet and said heat exchanger is in fluid communication with a pipeline via said vapor outlet.

21. A system comprising:
a vapor recovery tower configured to receive crude oil from a production well, said vapor recovery tower having a crude oil inlet, a crude oil outlet, a gas outlet, a vapor inlet and a vapor outlet,
a compressor in fluid communication with the gas outlet and the vapor inlet of said vapor recovery tower;
a heat exchanger configured to transfer from heat energy from about 2 to about 10 btu/minute for each barrel of oil per day passing through said heat exchanger, said heat exchanger located within said vapor recovery tower, the heat exchanger configured to transfer heat from a fluid passing through the heat exchanger to crude oil within said vapor recovery tower, said heat exchanger in fluid communication with said vapor inlet and said vapor outlet,
a conduit providing fluid communication between said vapor inlet and said compressor wherein said heat exchanger receives fluid from said compressor via said vapor inlet and said heat exchanger is in fluid communication with a pipeline via said vapor outlet.

22. A method comprising: passing a crude oil containing volatile compounds through a vapor recovery tower;
within the vapor recovery tower, inducing a phase change in a portion of the volatile compounds from a liquid phase to a gas and/or vapor phase;
separating the gas and/or vapor phase from liquid hydrocarbons;
passing the separated gas and/or vapor phase to a vapor recovery unit wherein the vapor recovery unit is a compressor;
compressing said gas and/or vapor phase prior to passing said gas and/or vapor through a heat exchanger located within said vapor recovery tower, wherein the step of compressing said gas and/or vapor phase increases the temperature of said gas and/or vapor phase to a temperature between about 180° F. and about 275° F.;
passing the gas and/or vapor phase through said heat exchanger thereby transferring heat from the compressed gas and/or vapor phase to crude oil within said vapor recovery tower thereby enhancing the phase change of volatile compounds within said crude oil from the liquid state to a gas and/or vapor state.

23. A method comprising:
passing a crude oil containing volatile compounds through a vapor recovery tower;
within the vapor recovery tower, inducing a phase change in a portion of the volatile compounds from a liquid phase to a gas and/or vapor phase;
separating the gas and/or vapor phase from liquid hydrocarbons;
passing the separated gas and/or vapor phase to a vapor recovery unit wherein the vapor recovery unit is a compressor; compressing said gas and/or vapor phase prior to passing said gas and/or vapor through a heat exchanger located within said vapor recovery tower;
passing the gas and/or vapor phase through said heat exchanger at a rate between about 10 thousand standard cubic feet per day up to about 2 million standard cubic feet per day, said heat exchanger thereby transferring heat from the compressed gas and/or vapor phase to crude oil within said vapor recovery tower thereby enhancing the phase change of volatile compounds within said crude oil from the liquid state to a gas and/or vapor state.

24. A method comprising:
passing a crude oil containing volatile compounds through a vapor recovery tower at a rate of about 10 bbl/day to about 5000 bbl/day;
within the vapor recovery tower, inducing a phase change in a portion of the volatile compounds from a liquid phase to a gas and/or vapor phase;
separating the gas and/or vapor phase from liquid hydrocarbons;
passing the separated gas and/or vapor phase to a vapor recovery unit wherein the vapor recovery unit is a compressor;
compressing said gas and/or vapor phase prior to passing said gas and/or vapor through a heat exchanger located within said vapor recovery tower;
passing the gas and/or vapor phase through said heat exchanger, said heat exchanger thereby transferring heat from the compressed gas and/or vapor phase to crude oil within said vapor recovery tower thereby enhancing the phase change of volatile compounds within said crude oil from the liquid state to a gas and/or vapor state.

* * * * *